US008770249B2

(12) United States Patent
Sumeer et al.

(10) Patent No.: US 8,770,249 B2
(45) Date of Patent: Jul. 8, 2014

(54) TEAR SEAL MOVEABLE GROUND JAW FOR A TUBING SEALER

(75) Inventors: Tulsie P. Sumeer, Tucson, AZ (US); Douglas F. Wright, Tucson, AZ (US); Shilpin Shah, Tucson, AZ (US)

(73) Assignee: Haemonetics Corporation, Braintree, MA (US)

( * ) Notice: Subject to any disclaimer, the term of this patent is extended or adjusted under 35 U.S.C. 154(b) by 411 days.

(21) Appl. No.: 11/874,805

(22) Filed: Oct. 18, 2007

(65) Prior Publication Data

US 2009/0101286 A1    Apr. 23, 2009

(51) Int. Cl.
*B29C 65/02*    (2006.01)

(52) U.S. Cl.
USPC ...................................... 156/379.6

(58) Field of Classification Search
USPC .......... 156/380.4, 379.6, 380.5, 380.6, 380.8, 156/579; 219/765, 769, 779, 200, 221, 227, 219/229, 230, 243
See application file for complete search history.

(56) References Cited

U.S. PATENT DOCUMENTS

| | | |
|---|---|---|
| 3,671,709 A | 6/1972 | Gidge |
| 4,013,860 A | 3/1977 | Hosterman et al. |
| 4,186,292 A | 1/1980 | Acker |
| 4,390,832 A * | 6/1983 | Taylor ........................... 323/273 |
| 4,488,028 A | 12/1984 | Acker et al. |
| 4,490,598 A | 12/1984 | Minney et al. |
| 4,491,711 A | 1/1985 | Acker |
| 4,496,819 A * | 1/1985 | Acker et al. .................. 219/769 |
| 4,529,859 A | 7/1985 | Minney et al. |
| D280,515 S | 9/1985 | Minney et al. |
| 5,160,396 A | 11/1992 | Jensen et al. |
| 5,272,304 A | 12/1993 | Been et al. |
| 5,345,070 A | 9/1994 | Hlavinka |
| 5,349,166 A | 9/1994 | Taylor |
| 5,520,218 A | 5/1996 | Hlavinka et al. |
| 5,543,604 A | 8/1996 | Taylor |
| D385,894 S | 11/1997 | Linner |
| 5,736,719 A | 4/1998 | Lawson et al. |
| 5,750,971 A * | 5/1998 | Taylor ........................... 219/769 |
| 6,132,429 A * | 10/2000 | Baker ............................. 606/50 |
| D494,608 S | 8/2004 | Wright |
| 6,784,407 B2 | 8/2004 | Wright et al. |
| D502,475 S | 3/2005 | Wright et al. |
| D502,476 S | 3/2005 | Wright et al. |

OTHER PUBLICATIONS

National Hospital Specialties: Genesis Tube Sealers.
Baxter Healthcare Corporation: Hematron III Tube Sealer.
Baxter Healthcare Corporation: Handyseal Tube Sealer, 2001.
Baxter Healthcare Corporation: Autoseal.

(Continued)

*Primary Examiner* — Daniel McNally

(57) ABSTRACT

Tubing sealers, whether hand held or desk mounted, heat seal liquid filled plastic tubing on command to develop sealed liquid filled easily separable segments serially attached to one another. The sealer generates a source of RF energy to heat seal the plastic tubing on placement of the tubing between a fixed jaw and a tubing compressing moveable ground jaw. The moveable ground jaw serves as a heat sink to dissipate heat and prevents a heat buildup during rapid repetitive operation of the sealer. The configuration of the moveable ground jaw coming in contact with the tubing primarily, but in combination with the degree of compression of the tubing and the RF power applied, controls both the integrity of the seal and the ease with which the sealed segments of tubing can be separated from one another.

8 Claims, 4 Drawing Sheets

(56) References Cited

OTHER PUBLICATIONS

Terumo: Teruflex, ACS-125, Dielectric Sealer.
Ace medical Inc.: Ace Sealer-01, Ultrasonic Wave Tube Sealer.
National Hospital Specialties: Biomixer-Blood Collection Mixers, Buisealer-Tube Sealers.
NPRI: Composeal Mobilea, A Portable, battery powers sealer.
Hemopharm Sealers.
Ljungberg & Kogel AB: Biosealer CR 6-PS.
Biotrans GmbH: Biotrans Composeal.
Wave Biotech LLC: Hot Lips Tube Sealer, 3/22/0.
Consolidated Polymer Technologies, Inc.: C-Flex Advanced Aseptic Connecting Device, 3/22/0.

* cited by examiner

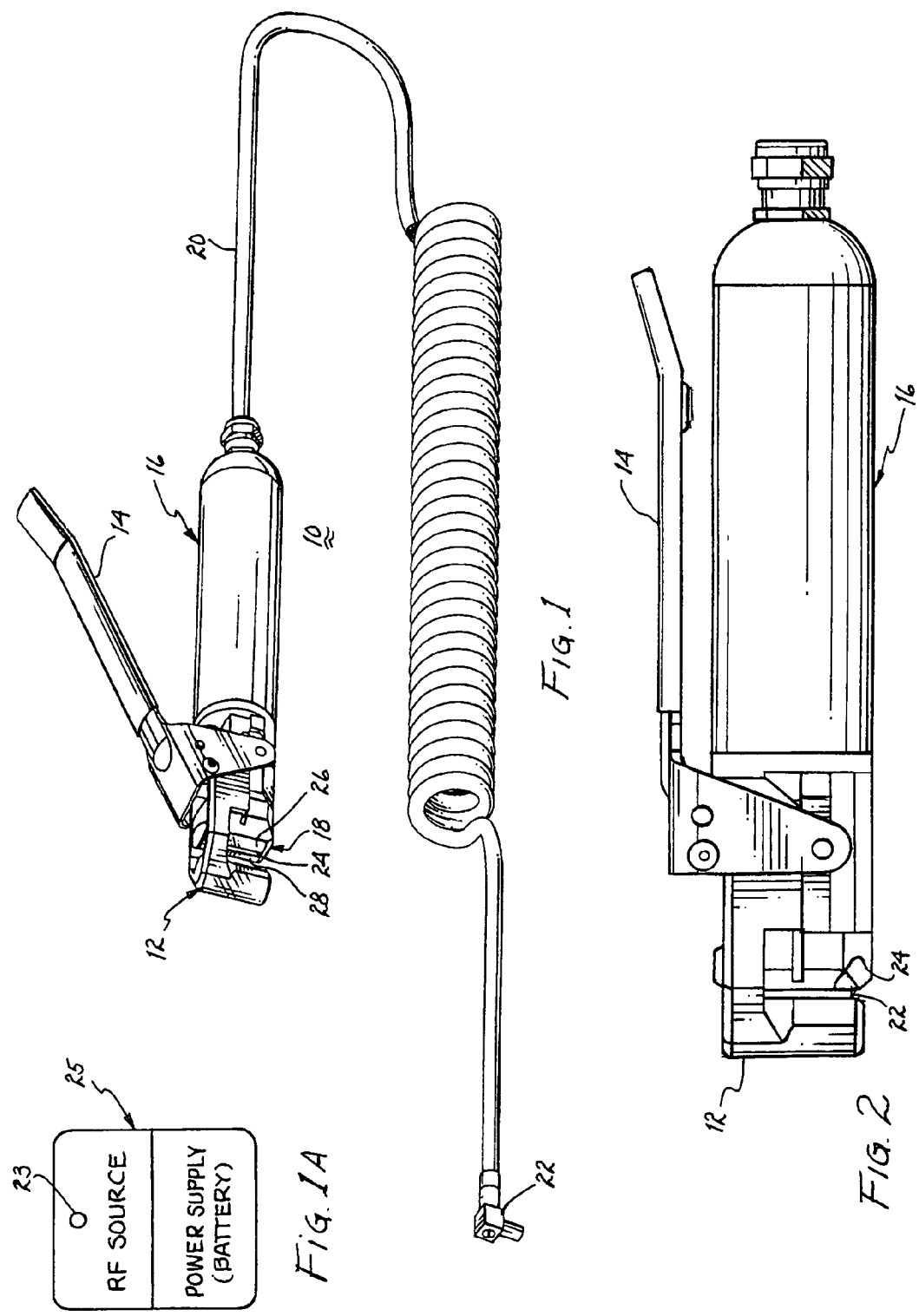

| Virtual Ground Jaw Radius (inches) | Clamped Force | Output Power | Size of Tubing | Weld Time | Tubing That Can Be Sealed | Internal Pressue (Rupture Test) |
|---|---|---|---|---|---|---|
| 0.07 | Original Lever | 40-50 Watts | S,M,L | 1.2 sec (S), 1.8 sec (M), 2.25 sec (L) | (S) - Easy, (M) - Easy and (L) - Medium | 80-100 psi |
| 0.075 | Original Lever | 40-50 Watts | S,M | 1.2 sec (S), 1.8 sec (M) | (S) - Easy, (M) - Medium and (L) - Unacceptable | 80-100 psi |
| 0.085 | Original Lever | 40-50 Watts | S,M | 1.2 sec (S), 1.8 sec (M) | (S) - Easy, (M) - Medium and (L) - Unacceptable | 80-100 psi |
| 0.2 | Original Lever | 40-50 Watts | S | 1.2 sec (S) | (S) - Medium, (M) - Unacceptable and (L) - Unacceptable | 20-30 psi |

Figure 10

| Tubing Size Category | Outside Diameter Range | Wall Thickness Range |
|---|---|---|
| Small | 0.148 - 0.170 in. 3.8 - 4.318 mm | 0.020 - 0.022 in. 0.5 - 0.558 mm |
| Medium | 0.171 - 0.187 in. 4.343 - 4.749 mm | 0.020 - 0.022 in. 0.5 - 0.558 mm |
| Large | 0.19 - 0.21 in. 5.00 - 5.33 mm | 0.027 - 0.037 in. 0.685 - 0.939 mm |

Figure 11

Inpatient Encounter Form

Small size (S) = Blood bag tubing
Medium size (M) = Apheresis tubing
Large size (L) = Grifols tubing

Figure 12

Segment Separation Force

Easy = 1 to 4 lbs.
Medium = 3 to 7 lbs.
Unacceptable > 8 lbs.

Figure 13

TEAR SEAL MOVEABLE GROUND JAW FOR A TUBING SEALER

BACKGROUND OF THE INVENTION

1. Field of the Invention

The present invention relates to tubing sealers, and more particularly, to the configuration of the movable ground jaw cooperating with a fixed jaw to form a tear seal across liquid filled plastic tubing.

2. Description of the Prior Art

There is a continuing existing need for blood donors in order to meet the day-to-day hospital demand for blood. The collection of blood from donors is a critical function performed in all towns, cities and metropolitan areas as the need for fresh blood and plasma by hospitals never diminishes. During periods of national emergency, the need may be significantly greater. Consequently, various private and government related blood collection centers have been established at permanent locations and mobile blood collection units are employed to service remote areas or to obtain blood from donors at specific high density locations, such as shopping centers, factories, office buildings, etc.

The process for collecting blood is a relatively simple process with respect to the participation of a donor. However, the means for testing, typing, storing and preserving the collected blood requires relatively sophisticated techniques and equipment to minimize loss from contamination or spoilage.

Normally, blood is drawn from a donor through flexible tubing extending into a plastic blood collection bag. Once the bag has been filled to a pre-determined quantity/weight, the tubing must be sealed to easily separate and destroy the phlebotomy needle, to prevent leakage and, more importantly, to prevent contamination and deterioration of the collected blood. After collection, the blood must be typed and tested under various criteria. To provide a representative supply of blood for these typing and testing purposes, a plurality of blood filled segments of tubing are sealed from one another to provide a plurality of segregable sealed samples which are opened only for typing and testing purposes.

At many blood collection centers, such as those operated by the Red Cross, much of the manual labor is performed as charitable work by older persons. These persons are often physically handicapped by the natural processes of aging, by arthritis or by previous injuries. For these persons who perform the work of sealing segments of filled blood tubing, the operation of the equipment must require a minimum of effort, be easy to use after minimal instruction, and minimize operator fatigue.

To meet these needs, desk mounted sealers have been developed by the present assignee. U.S. Pat. Nos. (1) 4,186,292; (2) 4,390,832; (3) 4,529,859; and (4) 6,784,407 describe desk-mounted sealers usable by an operator who may be either seated or standing. The configuration of the desk sealers disclosed in these patents, which patents are incorporated herein by reference, provide a line of sight for the operator, whether seated or standing, thereby, operator fatigue is diminished and accurate positioning of the liquid filled tubing to be automatically sealed is promoted. Through actuation of a tubing position sensing switch or a foot operated switch, a seal will be effected in the tubing placed intermediate a fixed (positive) jaw and a moveable (ground) jaw thereby allowing the operator to use one or both hands to repetitively place and reposition the tubing intermediate the jaws. The housing of the desk sealer encloses the operative elements to protect them against seepage of fluid thereinto, whether from a burst liquid filled length of tubing or otherwise.

At mobile collection centers, hand held battery operated tubing sealers are generally used by phlebotomists due to the required mobility during the blood collection process at such locations. U.S. Pat. Nos. (5) 4,013,860; (6); 4,491,711; and (7) 5,349,166 assigned to the present assignee disclose various configurations of hand held tubing sealers, which disclosures are incorporated herein by reference. A hand held tubing sealer includes a body housing electronic circuitry for applying radio frequency (RF) energy to the tubing to be sealed and a power source. An electrical conductor extends from the body to a housing containing a circuit for generating the RF energy and the source of electrical power, such as a portable battery. The housing is usually supported on the person of the phlebotomist. The body of the hand sealer may also include further circuits for controlling the transmission of RF energy. A pivotable lever extends from the body and upon pivotal movement toward the body draws a moveable ground jaw toward a fixed jaw to compress the liquid filled tubing therebetween. Commensurate therewith, a switch is actuated to transmit RF energy from the fixed jaw to the moveable ground jaw as a function of the degree of compression of the liquid filled tubing placed therebetween. The RF energy transmitted heats the tubing to or close to the melting temperature to weld the side walls of the tubing with one another and form a seal therebetween. Transmission of RF energy is halted as a function of the relative position between the moveable ground jaw and the fixed jaw. Upon formation of the weld, the lever is released to permit the moveable ground jaw to be repositioned away from the fixed jaw and accommodate removal of the sealed liquid filled tubing.

As plastic is heated during transmission of the RF energy from the fixed jaw to the moveable ground jaw, dissipation of the heat must be accomplished quickly to prevent heat buildup both from an operator safety standpoint and to prevent premature melting of the tubing. The moveable ground jaw serves the function of a heat sink to accommodate conductive absorption and radiation of the heated plastic tubing. To enhance heat dissipation, the moveable ground jaw is formed as a relatively massive unit and it is configured to provide a relatively large surface area to encourage heat radiation and convective air cooling.

Numerous sealers for liquid filled plastic tubing have been developed, not only by the present assignee, but by numerous other entities. The major difficulty encountered during development of each of these sealers is that of controlling the melting of the tubing to form a strong seal between adjacent segments capable of withstanding centrifuging pressures imposed upon the liquid within the tubing segments without compromising the seal. Secondly, the serial sealed segments of liquid filled tubing must be easily separated from one another. That is, the seal between pairs of segments must be capable of being uniformly torn to separate the segments with low force and yet the seal for each segment must be maintained to contain the liquid in each segment.

It may be noted that pre-existing tubing sealers usually had a rib of rectangular cross-section formed on the ground jaw. This produced a channel across the tubing in the area of the seal. It defined the preferred location of tear between the adjacent segments.

SUMMARY OF THE INVENTION

A fixed jaw and a moveable ground jaw, whether mounted in a hand held sealer or a desk mounted sealer, compresses, heats, elongates, spreads and forms a weld across liquid filled tubing placed therebetween. The fixed jaw transmits RF energy to the moveable ground jaw to perform the function of heating the tubing placed therebetween. The fixed jaw is generally an elongated metallic element or strip having a flat or planar surface coming in contact with the tubing. A pair of ceramic inserts are disposed on opposed sides of the strip and extend laterally and away from the plane of the planar surface. The moveable ground jaw is relatively massive to serve as a heat sink to dissipate and prevent heat buildup and is configured to have significant surface area for convective cooling and radiating the heat into the environment. The configuration of the moveable ground jaw coming into contact with the tubing is primarily responsible for effecting compression, focusing RF energy, elongating and welding opposed sidewalls of the tubing with one another. Furthermore, the configuration of the moveable ground jaw has a primary influence on the integrity of the weld or seal formed across the tubing and on the ease and uniformity with which adjacent segments of tubing can be torn apart across the weld. Through much experimentation over a period of years it has been learned that a cylindrical moveable ground jaw surface having a longitudinal axis aligned with the planar surface of the strip on the positive jaw will form a seal that exceeds the parameters of integrity, segment separation and suitability along the weld, while requiring a minimum amount of energy.

It is therefore a primary object of the present invention to provide a pair of jaws for a tubing sealer which produce a very high quality seal and yet permit easy tearing of the seal to separate segments of liquid filled tubing without compromising the seal attendant each segment.

Another object of the present invention is to provide a moveable ground jaw for a tubing sealer having a cylindrical surface coming in contact with the tubing to effect a seal thereacross.

Still another object of the present invention is to provide an efficient moveable ground jaw for a tubing sealer that minimizes the power requirements of RF energy produced to heat tubing and form a weld thereacross.

Yet another object of the present invention is to provide fixed and moveable ground jaws for a tubing sealer that reduces the power provided by a battery to generate RF energy without compromising the integrity of the seal being formed.

A further object of the present invention is to provide an efficient tubing sealer, whether in the form of a desk mounted or hand held tubing sealer, which permits use of a portable battery for an extended period of time.

A still further object of the present invention is to provide a method for forming seals across liquid filled plastic tubing that are stronger than the burst strength of the tubing itself and yet permit the facile segregation of adjacent sealed segments of the tubing.

A yet further object of the present invention is to provide a configuration of a moveable ground jaw for a tubing sealer that rapidly dissipates heat and provides seals of high integrity and easy tearability to separate serial segments of tubing from one another.

These and other objects of the present invention will become apparent to those skilled in the art as the description thereof proceeds.

A BRIEF DESCRIPTION OF THE DRAWINGS

The present invention will be described with greater specificity and clarity with reference to the following drawings, in which:

FIG. 1 illustrates the hand held sealer embodying the present invention;

FIG. 1A illustrates a housing for providing a source of power and a source of RF energy;

FIG. 2 illustrates a hand held sealer shown in FIG. 1 with the lever in the closed position to draw the moveable ground jaw toward the fixed jaw;

FIG. 10 is a table reciting various results obtained upon testing the seals between serial segments of liquid filled plastic tubing through use of the present invention;

FIG. 11 is a table reciting the parameters of the different tubings tested and reflected in FIG. 10; and FIGS. 12 and 13 are legends for the notations shown in FIG. 10.

DESCRIPTION OF THE PREFERRED EMBODIMENT

Figure 3:
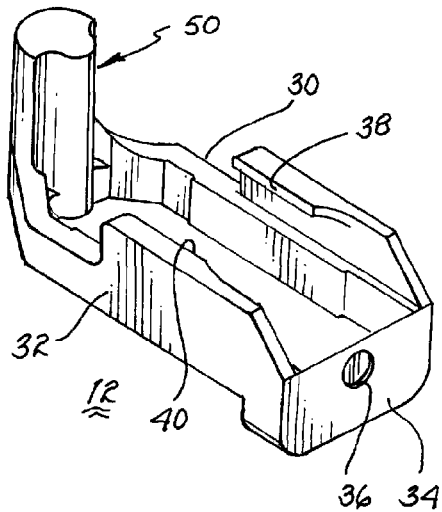
FIG. 3 is an isometric view of the moveable ground jaw.
Figure 4:
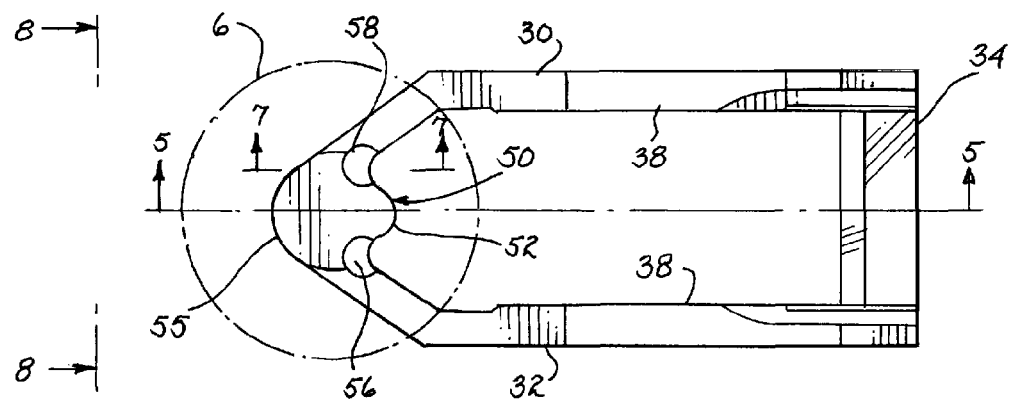
FIG. 4 is a top view of the moveable ground jaw.
Figure 5:
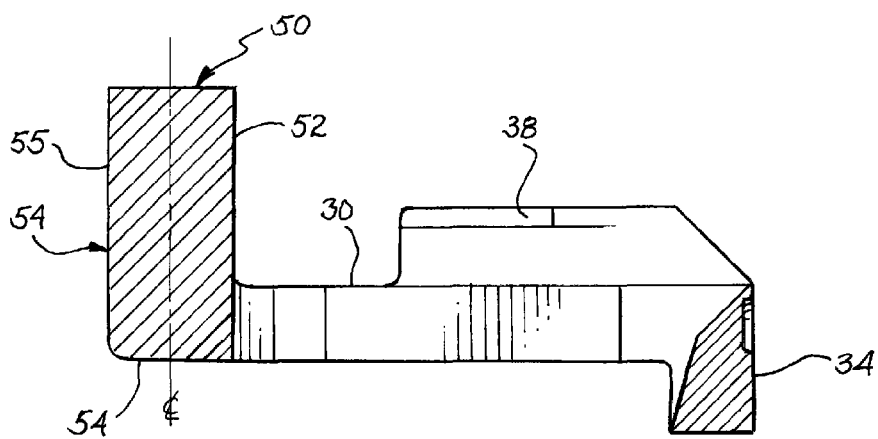
FIG. 5 is a cross-sectional view taken along lines 5-5, as shown in FIG. 4.
Figure 6:
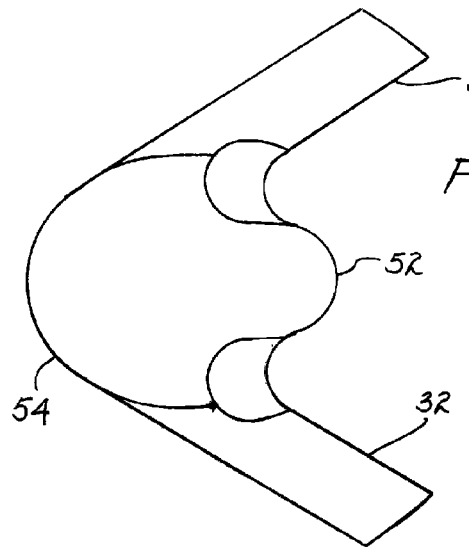
FIG. 6 is a top view taken within circle 6, as shown in FIG. 4.
Figure 7:
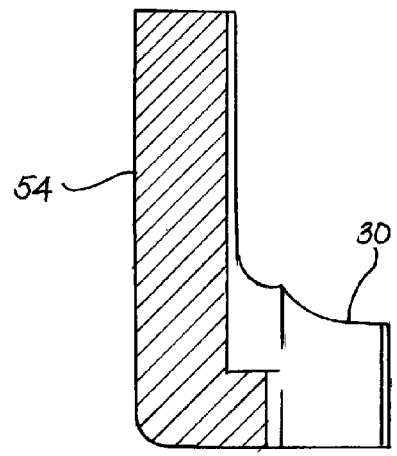
FIG. 7 is a partial cross-sectional view taken along lines 7-7 as shown in FIG. 4.
Figure 8:
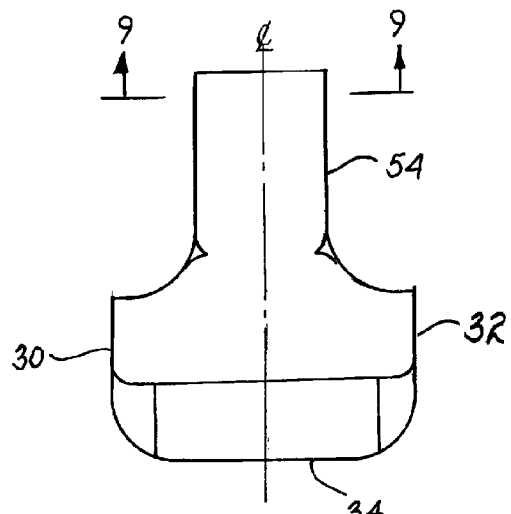
FIG. 8 is an end view taken along lines 8-8, as shown in FIG. 4.
Figure 9:
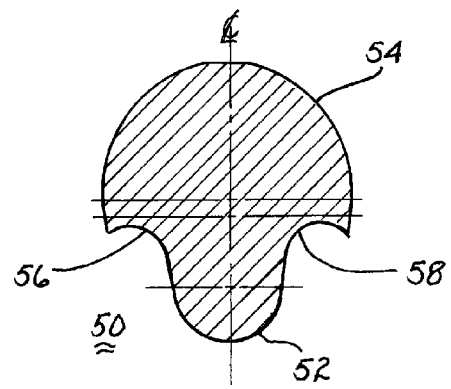
FIG. 9 is a cross-sectional view taken along lines 9-9, as shown in FIG. 8.

FIG. 1 illustrates a hand held sealer 10 embodying a moveable ground jaw 12 upon pivotal movement of handle 14 toward body 16. The body includes electronic circuitry for controlling/regulating RF energy to be transmitted from fixed jaw 18 to moveable ground jaw 12. Additionally, the body includes mechanical elements responsive to movement of handle 14 for drawing moveable ground jaw 12 toward fixed jaw 18. An electrical conductor 20 includes a plug 22 for connection to a socket 23 in a housing 25, as shown in FIG. 1A. The housing includes a source electrical power, usually a rechargeable battery and a source for generating RF energy. It is to be understood that the source for generating RF energy could be housed in body 16.

As particularly shown in FIG. 2, upon movement of handle 14 toward body 16, moveable ground jaw 12 is proximate RF conducting planar strip 24 of fixed jaw 18. Typically, the strip is bracketed between ceramic inserts 26, 28. The surfaces of the ceramic inserts may be curved laterally away from a plane corresponding with planar strip 24. It is to be understood that under certain conditions, the closed position of fixed jaw 18 and moveable ground jaw 12, there may be a minimum space between the jaws exists to accommodate a minimal thickness to control the segment separation force.

Referring to FIG. 3, moveable ground jaw 12 is shown. The moveable ground jaw includes a pair of longerons 30, 32 extending the rearwardly to a base 34. The base may include a recess 36 for receiving a coil spring to urge movement of moveable ground jaw 12 away from fixed jaw 18 upon release of handle 14. A pair of inwardly extending lips 38, 40 may be incorporated to serve as guides cooperating with channels/supports in body 16 during rectilinear translation of moveable ground jaw 12. It is to be understood that the various additional mechanical elements may be incorporated to secure moveable ground jaw 12 with body 16 while accommodating translatory movement of the moveable ground jaw.

The moveable ground jaw includes a post 50 supported by longerons 30, 32 that cooperates with strip 24 of fixed jaw 18 and will be described with primary reference to FIGS. 4-9. Post 50 is defined in part by a section of a cylindrical surface 52, that may be semi-cylindrical, positionally aligned with and centered upon strip 24 of the fixed jaw. That is, the longitudinal axis of strip 24 and the longitudinal axis of cylindrical surface 52 are essentially parallel with one another in all three planes. Post 50 includes a base 54 that defines a part of a cylinder 55 rearwardly of cylindrical surface 52. The interconnecting surfaces between the surface of cylinder 55 and cylindrical surface 52 are in the nature of reversely curved (concave) troughs 56, 58. There surfaces may also be in the form of cylindrical surfaces.

This configuration of post 50 has several benefits. First, the configuration of cylindrical surface 52 tends to focus the transmission of RF energy from strip 24 of the fixed jaw to the forward most or closest part of the cylindrical surface. Thereby, the RF energy transmitted through the compressed plastic tubing will be concentrated along a narrow path across the tubing. Second, the massiveness of post 50 rearwardly of cylindrical surface 52 serves in the manner of a heat sink to draw heat from the cylindrical surface to the major part of the post. The cylinder of the post urges uniform convection and radiation of heat into the environment. Additionally, the cylindrical surfaces of troughs 56, 58 provide additional surface area for radiating heat embodied in the post. Longerons 30, 32 extending from post 50 have the capability of further conducting heat away from the post for dissipation by conduction, convection and radiation to the surrounding environment.

FIG. 10 is a table that sets forth the results of seals formed in small, medium and large sized tubing, which sizes are recited in the table shown in FIG. 11 for each of several different radii for cylindrical surface 52. For each of these tests, the output power was maintained within a range of 40-50 watts. As noted in the far right of the table in FIG. 10, rupture of the sealed segments occurred only when the internal pressure exerted was in the range of 80-100 psi. In fact, in most cases the tubing itself ruptured prior to rupture of the attendant seal.

The table in FIG. 12 recites typical uses in industry of the small, medium and large sized tubing.

The table in FIG. 13 recites the ranges of separation force corresponding with the words "easy," "medium" and "unacceptable" set forth under the column "Tubing That Can Be Sealed" in FIG. 10. These ranges of force are extraordinarily low by industry standards. Moreover, the ranges provide unexpected results considering the corresponding range of high internal pressure that could be applied before rupture of either the tubing sidewall or the seal. Heretofore, this combination has not been available for any hand held or desk mounted tubing sealers known by the inventors or the assignee.

It may be pointed out that for small sized tubing, the weld time is only 1.2 seconds. Thus, the time of heat generation and the RF energy transmitted to the moveable ground jaw is minimal. Because of the configuration of the moveable ground jaw described above, dissipation of heat is rapid and heat buildup is essentially non-existent. Even with the medium sized tubing and the large sized tubing, the weld time is still within the range of 1.8 to 2.25 seconds. Considering the number of seconds an experienced operator takes to perform successive welds, the ratio of weld time to total time between welds is very low and promotes dissipation of any heat buildup that may occur.

It may be further noted that the best test results achieved were those wherein cylindrical surface 52 had a radius of 0.07 inches. This small radius tends to focus and concentrate the transmission of RF energy through the tubing along a very narrow band. As the jaws compress the tubing, the melting part of the tubing in contact with the moveable ground jaw is caused to migrate laterally in each direction due to the uniform curvature of the moveable ground jaw on either side of the central point of contact. This has the benefit of providing a relatively thin section of tubing between the segments of tubing to enhance tearing the segments apart from one another. It also creates a buildup of plastic mass at the closure end of each segment. It is believed that this mass is what causes the seal to be very robust and in several tests the tubing itself has ruptured prior to rupture of the seal.

The power requirement of 40-50 watts for just over one second to effect a seal across the small tubing causes very little power drain from a battery when used to supply the electric power. Thus, the performance of a battery on a per-charge basis is significantly enhanced.

To present the reduced separation or tear force of 1 to 4 pounds for small sized tubing achieved by the present invention in proper perspective, it is noted that existing tubing sealers provide seals between segments of liquid filled small sized tubing that require a force of 6-10 pounds to segregate two segments from one another. This difference in force becomes of paramount importance to clinicians working with blood filled tubing segments as fatigue is a function of the tearing effort expended. Moreover, the fatigue comes with the likelihood of making mistakes.

Although details of the circuitry for generating and controlling transmission of RF energy between the fixed jaw and the moveable ground jaw are described in detail in the above recited patents incorporated herein by reference, certain general statements will be made to assist in understanding the operation of a tubing sealer constructed in accordance with the present invention. Any of the circuits described in detail in the assignee's patents incorporated herein by reference may be used in conjunction with the fixed jaw and moveable ground jaw described herein. The circuits, with some variations, essentially perform the same function. A tuned circuit controls the transmission of RF energy. As the jaws approach one another during normal operation, the tuned circuit becomes de-tuned due to a change in impedance between the fixed jaw and the moveable ground jaw. Such de-tuning controls the transmission of RF energy and reduces the RF energy transmitted as the jaws come close to one another until at a certain relative position of the jaws the transmission of RF is halted.

In presently used hand held sealers that are battery operated, 70 watts of electrical power is normally required. Furthermore, the time for making a seal with existing equipment is normally significantly greater than 2 seconds. With the present invention, the power requirement is reduced by one-half (½) to two-thirds (⅔) over that of exiting tubing sealers. Additionally, the time to make a seal is significantly reduced. Hence, not only is less power required, but such power need be generated for a much shorter period of time. Thus, for a given battery capacity, many more seals can be made by incorporating the present invention in a tubing sealer than are possible from existing tubing sealers.

Considering that significantly reduced power and reduced time for making a seal, it is unexpected that such seals are capable of withstanding much higher burst pressures and yet require only one-third (⅓) to one-half (½) half of the force necessary to separate the segments of liquid filled tubing. Truly, the present invention provides results heretofore unexpected and unknown.

We claim:

1. An RF energized plastic tubing sealer for sealing plastic tubing placed intermediate a fixed jaw and movable ground jaw comprising in combination:

a movable ground jaw comprising:
 a) a post;
 b) a semi-cylindrical surface formed as part of said post that is interconnected at both ends to reversely curved troughs;
 c) a pair of longerons extending from said post and engaged with the tubing sealer to permit rectilinear translation of said post relative to a fixed jaw, and
a fixed jaw mounted on the tubing sealer that includes a strip having a planar surface of electrically conductive material and wherein the longitudinal center of said semi-cylindrical surface of the moveable ground jaw is adjacent and aligned with the strip of the fixed jaw to urge focus of RF transmitted energy from the fixed jaw to the longitudinal area of the cylindrical surface of the moveable ground jaw physically closest to the strip.

2. The tubing sealer as defined in claim 1 wherein said post includes a base cylindrical surface and one of said troughs being disposed on each side of base cylindrical surface interconnecting said base cylindrical surface with said semi-cylindrical surface.

3. The tubing sealer as defined in claim 2 wherein the base cylindrical surface has a larger radius than the radius of the semi-cylindrical surface.

4. The tubing sealer as defined in claim 1 wherein each of said troughs have a surface that defines a part of a cylindrical surface.

5. An RF energized tubing sealer for sealing plastic tubing placed intermediate a fixed jaw and a moveable ground jaw, said tubing sealer comprising in combination:
 a) a source of RF energy for heating the tubing;
 b) said fixed jaw including a strip having a planar surface for contacting the tubing to be sealed and for transmitting RF energy from said source of RF energy to said moveable ground jaw;
 c) said moveable ground jaw including a post supporting a section of a cylindrical surface that is interconnected at both ends to reversely curved troughs, said cylindrical surface longitudinally aligned with and centered upon said strip for compressing the tubing placed between said fixed jaw and said moveable ground jaw and for receiving the RF energy transmitted from said strip; and
 d) at least one rectilinearly translatable longeron supporting said post to reposition said cylindrical surface toward and away from said strip.

6. The tubing sealer as set forth in claim 5 wherein said post includes a base cylindrical surface and one of said troughs being disposed on each side of base cylindrical surface interconnecting said base cylindrical surface with said cylindrical surface.

7. The tubing sealer as set forth in claim 6 wherein each of said troughs have a surface that defines a part of a cylindrical surface.

8. The tubing sealer as set forth in claim 6 wherein the base cylindrical surface has a larger radius than the radius of the cylindrical surface.

\* \* \* \* \*